(12) United States Patent
Liu et al.

(10) Patent No.: US 10,256,951 B2
(45) Date of Patent: Apr. 9, 2019

(54) METHOD AND APPARATUS FOR CONFIGURING AND TRANSMITTING PILOT

(71) Applicant: Huawei Technologies Co., Ltd., Shenzhen (CN)

(72) Inventors: Kunpeng Liu, Shenzhen (CN); Jianghua Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 4 days.

(21) Appl. No.: 14/611,743

(22) Filed: Feb. 2, 2015

(65) Prior Publication Data

US 2015/0146668 A1    May 28, 2015

Related U.S. Application Data

(63) Continuation of application No. PCT/CN2012/079586, filed on Aug. 2, 2012.

(51) Int. Cl.
  *H04L 5/00*    (2006.01)
  *H04L 27/26*    (2006.01)

(52) U.S. Cl.
  CPC .......... *H04L 5/0035* (2013.01); *H04L 5/0051* (2013.01); *H04L 5/0069* (2013.01); *H04L 27/2613* (2013.01); *H04L 5/0007* (2013.01)

(58) Field of Classification Search
  None
  See application file for complete search history.

(56) References Cited

U.S. PATENT DOCUMENTS

| 2007/0082692 A1 | 4/2007 | Tirkkonen et al. |
| 2013/0010833 A1 | 1/2013 | Ogawa et al. |

(Continued)

FOREIGN PATENT DOCUMENTS

| CN | 101305529 A | 11/2008 |
| CN | 101938296 A | 1/2011 |

(Continued)

OTHER PUBLICATIONS

"$3^{rd}$ Generation Partnership Project; Technical Specification Group Radio Access Network; Evolved Universal Terrestrial Radio Access (E-UTRA); Physical Channels and Modulation (Release 10)," 3GPP TS 36.211, V10.4.0, pp. 1-101, $3^{rd}$ Generation Partnership Project, Valbonne, France (Dec. 2011).

(Continued)

*Primary Examiner* — Saumit Shah
(74) *Attorney, Agent, or Firm* — Leydig, Voit & Mayer, Ltd.

(57) ABSTRACT

Disclosed a method and an apparatus for configuring and transmitting a pilot, the method includes: a UE determines, according to a partitioned resource set, a parameter for generating an initial value of a demodulation pilot sequence; generates an initial value of the demodulation pilot sequence on the first resource set according to the first parameter, and generates an initial value on the second resource set according to the second parameter; and obtains the demodulation pilot sequence according to the initial value. In embodiments of the present invention, since parameters for calculating the initial value of the demodulation pilot sequence are respectively configured according to a pre-partitioned resource set, the initial value can be calculated according to the resource set to which the E-PDCCH belongs and the set parameter, thus obtaining the demodulation pilot sequence (Continued)

for demodulating the E-PDCCH, so as to improve demodulation performance of the E-PDCCH.

19 Claims, 5 Drawing Sheets

(56) References Cited

U.S. PATENT DOCUMENTS

| | | | | |
|---|---|---|---|---|
| 2013/0064216 A1* | 3/2013 | Gao | ............ | H04L 5/0016 370/330 |
| 2013/0201942 A1* | 8/2013 | Kim | ............ | H04W 76/045 370/329 |
| 2013/0294366 A1* | 11/2013 | Papasakellariou | ............ | H04W 72/0406 370/329 |
| 2013/0301562 A1* | 11/2013 | Liao | ............ | H04W 72/042 370/329 |
| 2014/0247775 A1* | 9/2014 | Frenne | ............ | H04L 5/0048 370/329 |

FOREIGN PATENT DOCUMENTS

| | | |
|---|---|---|
| EP | 2804355 A1 | 11/2014 |
| WO | WO 2011121925 A1 | 10/2011 |

OTHER PUBLICATIONS

"DMRS Scrambling for Enhanced Control Channels," 3GPP TSG RAN WG1 Meeting #69, Prague, Czech Republic, R1-122251, $3^{rd}$ Generation Partnership Project, Valbonne, France (May 21-25, 2012).

"DM RS sequence configuration for ePDCCH," 3GPP TSG RAN Working Group 1 Meeting #69, Prague, Czech Republic, R1-122455, $3^{rd}$ Generation Partnership Project, Valbonne, France (May 21-25, 2012).

"Scrambling sequence initialization of DMRS for ePDCCH," 3GPP TSG RAN WG1 #69, Prague, Czech Republic, R1-122740, $3^{rd}$ Generation Partnership Project, Valbonne, France (May 21-25, 2012).

"Discussion on DMRS scrambling sequence for enhanced PDCCH," 3GPP TSG RAN WG1 Meeting #69, Prague, Czech Republic, R1-122103, $3^{rd}$ Generation Partnership Project, Valbonne, France (May 21-25, 2012).

* cited by examiner

METHOD AND APPARATUS FOR CONFIGURING AND TRANSMITTING PILOT

CROSS-REFERENCE TO RELATED APPLICATIONS

This application is a continuation of International Patent Application No. PCT/CN2012/079586, filed on Aug. 2, 2012, which is hereby incorporated by reference in its entirety.

TECHNICAL FIELD

The present invention relates to the field of communication technologies, and particularly to a method and an apparatus for configuring and transmitting a pilot.

BACKGROUND

A coordinated multi-point (CoMP) transmission technology is introduced in a long term evolution (LTE) communication system, so as to improve the spectral efficiency of the system and the performance of a cell edge user. As the number of users in the communication system using the CoMP technology increases, it has been difficult for the existing physical downlink control channel (PDCCH) resource which is used for transmitting user scheduling indication information to meet the requirement of scheduling users, and therefore, an enhanced-physical downlink control channel (E-PDCCH) resource is further defined on the time-frequency resource, the E-PDCCH resource occupies a part of the existing physical downlink shared channel (PDSCH) resource, and frequency division multiplexing (FDM) is adopted between the E-PDCCH resource and the PDSCH resource to share the time-frequency resources.

Since the E-PDCCH multiplexes a part of the PDSCH resource, the user equipment (UE) adopts a same demodulation manner with the PDSCH, namely, demodulating the E-PDCCH with a demodulation reference signal (DMRS). The UE needs to generate an initial value of DMRS when obtaining the DMRS in each time slot, and the generation of the initial value of DMRS relates to three parameters, including a time slot number, a scrambling code ID notified by a base station, and an initial ID of DMRS which is selected by a network side from a candidate ID set and used for transmitting in the present time slot. Among the above three parameters, the scrambling code ID and the initial ID of DMRS need to be transmitted via the E-PDCCH, however, the parameter for calculating the DMRS is obtained by demodulating the E-PDCCH, and demodulating the E-PDCCH also needs the DMRS, therefore, according to the existing manner, it is difficult for the UE to obtain the DMRS for the control channel E-PDCCH, and thus it is not possible to demodulate the E-PDCCH for obtaining scheduling indication information.

SUMMARY

Accordingly, embodiments of the present invention provide a method and an apparatus for configuring and transmitting a pilot, so as to solve the problem in the prior art that it is difficult to obtain a DMRS for demodulating the control channel E-PDCCH.

A first aspect of the present invention provides a method for configuring a pilot, including:

determining, by a user equipment (UE) and according to a resource set, a parameter for generating an initial value of a demodulation pilot sequence, where the resource set includes a first resource set and a second resource set, and the parameter includes a first parameter and a second parameter;

generating an initial value of a first demodulation pilot sequence on the first resource set according to the first parameter, and generating an initial value of a second demodulation pilot sequence on the second resource set according to the second parameter;

obtaining the demodulation pilot sequence respectively by using the initial value of the first demodulation pilot sequence and the initial value of the second demodulation pilot sequence.

In a first possible implementation by combining the first aspect, the first resource set includes a physical resource element set provided on a system bandwidth, and the second resource set includes a physical resource element set on the system bandwidth except the provided physical resource element set.

In the first possible implementation by combining the first aspect, the physical resource element set included in the first resource set is a physical resource element set except the physical resource element set configured to the UE, and the physical resource element set included in the second resource set is a physical resource element set configured to the UE; or the physical resource element set included in the second resource set is other physical resource element set in the physical resource element set configured to the UE, except the physical resource element set included in the first resource set.

In a second possible implementation by combining the first aspect, the first resource set includes a physical resource element set transmitted in a discrete transmission mode, and the second resource set includes a physical resource element set transmitted in a centralized transmission mode.

In a third possible implementation by combining the first aspect, the first resource set includes a physical resource element set in beamforming transmission, and the second resource set includes a physical resource element set in diversity transmission.

In a fourth possible implementation by combining the first aspect, the first resource set includes a physical resource element set corresponding to a common search space, and the second resource set includes a physical resource element set corresponding to a user-dedicated search space.

In a fifth possible implementation by combining the first aspect, the first resource set includes a physical resource element set corresponding to transmitting a first downlink control information format (DCI format) set, and the second resource set includes a physical resource element set corresponding to transmitting a second DCI format set.

In a sixth possible implementation by combining the first aspect, the first resource set includes a physical resource element set for transmitting common control signaling, and the second resource set includes a physical resource element set for transmitting a user equipment (UE) dedicated control signaling set.

In a seventh possible implementation by combining the first aspect, the first resource set includes a physical resource element set corresponding to control signaling which is CRC-masked according to at least one of a system information-radio network temporary identifier (SI-RNTI), a paging-radio network temporary identifier (P-RNTI), a temporary RNTI, a random access-radio network temporary identifier (RA-RNTI), a semi persistent-radio network temporary identifier (SPS-RNTI) and a transmit power control-radio network temporary identifier (TPC-RNTI), and the second resource set includes a physical resource element set corresponding to control signaling which is CRC-masked according to a cell-radio network temporary identifier (C-RNTI).

In a eighth possible implementation by combining the first aspect, the first resource set includes a physical resource element set corresponding to a first pilot port set, and the second resource set includes a physical resource element set corresponding to a second pilot port set.

In a ninth possible implementation by combining the first aspect, the first parameter includes a scrambling code ID which is set to 0 or 1, and an initial ID of the first demodulation pilot sequence which is set to a cell ID of a cell where the UE is located; and the second parameter includes: a scrambling code ID configured by a network side, and an initial ID of the second demodulation pilot sequence configured by the network side; or a scrambling code ID which is set to 0 or 1, and an initial ID of the second demodulation pilot sequence configured by the network side; or a scrambling code ID configured by the network side, and an initial ID of the second demodulation pilot sequence which is set to the cell ID of the cell where the UE is located.

In a ninth possible implementation by combining the first aspect, the scrambling code ID configured by the network side includes:

a scrambling code ID configured by the network side for a physical downlink shared channel (PDSCH); or a scrambling code ID configured by the network side for an enhanced physical downlink control channel (E-PDCCH); the initial ID of the second demodulation pilot sequence configured by the network side includes: an initial ID of the demodulation pilot sequence configured by the network side for the PDSCH; or an initial ID of the demodulation pilot sequence configured by the network side for the E-PDCCH.

A second aspect of the present invention provides a method for transmitting a pilot, including:

determining, by a base station and according to a resource set, a parameter for generating an initial value of a demodulation pilot sequence, where the resource set includes a first resource set and a second resource set, and the parameter includes a first parameter and a second parameter;

generating an initial value of a first demodulation pilot sequence on the first resource set according to the first parameter, and generating an initial value of a second demodulation pilot sequence on the second resource set according to the second parameter;

obtaining the demodulation pilot sequence respectively by using the initial value of the first demodulation pilot sequence and the initial value of the second demodulation pilot sequence; and transmitting the demodulation pilot sequence on a time-frequency resource corresponding to the demodulation pilot sequence.

In a first possible implementation by combining the second aspect, the first resource set includes a physical resource element set provided on a system bandwidth, and the second resource set includes a physical resource element set on the system bandwidth except the provided physical resource element set; or the first resource set includes a physical resource element set transmitted in a discrete transmission mode, and the second resource set includes a physical resource element set transmitted in a centralized transmission mode; or the first resource set includes a physical resource element set in beamforming transmission, and the second resource set includes a physical resource element set in diversity transmission; or the first resource set includes a physical resource element set corresponding to a common search space, and the second resource set includes a physical resource element set corresponding to a user-dedicated search space; or the first resource set includes a physical resource element set corresponding to transmitting a first downlink control information format (DCI format) set, and the second resource set includes a physical resource element set corresponding to transmitting a second DCI format set; or the first resource set includes a physical resource element set for transmitting common control signaling, and the second resource set includes a physical resource element set for transmitting a user equipment (UE) dedicated control signaling set; or the first resource set includes a physical resource element set corresponding to control signaling which is CRC-masked according to at least one of a system information-radio network temporary identifier (SI-RNTI), a paging-radio network temporary identifier (P-RNTI), a temporary RNTI, a random access-radio network temporary identifier (RA-RNTI), a semi persistent-radio network temporary identifier (SPS-RNTI) and a transmit power control-radio network temporary identifier (TPC-RNTI), and the second resource set includes a physical resource element set corresponding to control signaling which is CRC-masked according to a cell-radio network temporary identifier (C-RNTI); or the first resource set includes a physical resource element set corresponding to a first pilot port set, and the second resource set includes a physical resource element set corresponding to a second pilot port set.

In a second possible implementation by combining the second aspect, the physical resource element set includes: at least one enhanced resource element group (eREG), or a resource element set corresponding to at least one enhanced control channel element (eCCE), or at least one physical resource block (PRB), or at least one physical resource block pair (PRB pair).

In a third possible implementation by combining the second aspect, the first parameter includes a scrambling code ID which is set to 0 or 1, and an initial ID of the first demodulation pilot sequence which is set to a cell ID of a cell where the UE is located; and the second parameter includes: a scrambling code ID configured by a network side, and an initial ID of the second demodulation pilot sequence configured by the network side; or a scrambling code ID which is set to 0 or 1, and an initial ID of the second demodulation pilot sequence configured by the network side; or a scrambling code ID configured by the network side, and an initial ID of the second demodulation pilot sequence which is set to the cell ID of the cell where the UE is located.

In a fourth possible implementation by combining the third possible implementation of the second aspect, the scrambling code ID configured by the network side includes: a scrambling code ID configured by the network side for a physical downlink shared channel (PDSCH); or a scrambling code ID configured by the network side for an enhanced physical downlink control channel (E-PDCCH); the initial ID of the second demodulation pilot sequence configured by the network side includes: an initial ID of the demodulation pilot sequence configured by the network side for the PDSCH; or an initial ID of the demodulation pilot sequence configured by the network side to the E-PDCCH.

A third aspect of the present invention provides an apparatus for configuring a pilot, including:

a determining unit, configured to determine, according to a resource set, a parameter for generating an initial value of a demodulation pilot sequence, where the resource set includes a first resource set and a second resource set, and the parameter includes a first parameter and a second parameter;

a generating unit, configured to generate an initial value of a first demodulation pilot sequence on the first resource set according to the first parameter, and generate an initial value of a second demodulation pilot sequence on the second resource set according to the second parameter;

an obtaining unit, configured to obtain the demodulation pilot sequence respectively by using the initial value of the first demodulation pilot sequence and the initial value of the second demodulation pilot sequence.

In a first possible implementation by combining the third aspect, the first resource set includes a physical resource element set provided on a system bandwidth, and the second resource set includes a physical resource element set on the system bandwidth except the provided physical resource element set; or the first resource set includes a physical resource element set transmitted in a discrete transmission mode, and the second resource set includes a physical resource element set transmitted in a centralized transmission mode; or the first resource set includes a physical resource element set in beamforming transmission, and the second resource set includes a physical resource element set in diversity transmission; or the first resource set includes a physical resource element set corresponding to a common search space, and the second resource set includes a physical resource element set corresponding to a user-dedicated search space; or the first resource set includes a physical resource element set corresponding to transmitting a first downlink control information format (DCI format) set, and the second resource set includes a physical resource element set corresponding to transmitting a second DCI format set; or the first resource set includes a physical resource element set for transmitting common control signaling, and the second resource set includes a physical resource element set for transmitting a user equipment (UE) dedicated control signaling set; or the first resource set includes a physical resource element set corresponding to control signaling which is CRC-masked according to at least one of a system information-radio network temporary identifier (SI-RNTI), a paging-radio network temporary identifier (P-RNTI), a temporary RNTI, a random access-radio network temporary identifier (RA-RNTI), a semi persistent-radio network temporary identifier (SPS-RNTI) and a transmit power control-radio network temporary identifier (TPC-RNTI), and the second resource set includes a physical resource element set corresponding to control signaling which is CRC-masked according to a cell-radio network temporary identifier (C-RNTI); or the first resource set includes a physical resource element set corresponding to a first pilot port set, and the second resource set includes a physical resource element set corresponding to a second pilot port set.

In a second possible implementation by combining the third aspect, the first parameter determined by the determining unit includes a scrambling code ID which is set to 0 or 1, and an initial ID of the first demodulation pilot sequence which is set to a cell ID of a cell where the UE is located; and the second parameter determined by the determining unit includes: a scrambling code ID configured by a network side, and an initial ID of the second demodulation pilot sequence configured by the network side; or a scrambling code ID which is set to 0 or 1, and an initial ID of the second demodulation pilot sequence configured by the network side; or a scrambling code ID configured by the network side, and an initial ID of the second demodulation pilot sequence which is set to the cell ID of the cell where the UE is located.

A fourth aspect of the present invention provides an apparatus for transmitting a pilot, including:

a determining unit, configured to determine, according to a resource set, a parameter for generating an initial value of a demodulation pilot sequence, where the resource set includes a first resource set and a second resource set, and the parameter includes a first parameter and a second parameter;

a generating unit, configured to generate an initial value of a first demodulation pilot sequence on the first resource set according to the first parameter, and generate an initial value of a second demodulation pilot sequence on the second resource set according to the second parameter;

an obtaining unit, configured to obtain the demodulation pilot sequence respectively by using the initial value of the first demodulation pilot sequence and the initial value of the second demodulation pilot sequence; and a transmitting unit, configured to transmit the demodulation pilot sequence on a time-frequency resource corresponding to the demodulation pilot sequence.

In a first possible implementation by combining the fourth aspect, the first resource set includes a physical resource element set provided on a system bandwidth, and the second resource set includes a physical resource element set on the system bandwidth except the provided physical resource element set; or the first resource set includes a physical resource element set transmitted in a discrete transmission mode, and the second resource set includes a physical resource element set transmitted in a centralized transmission mode; or the first resource set includes a physical resource element set in beamforming transmission, and the second resource set includes a physical resource element set in diversity transmission; or the first resource set includes a physical resource element set corresponding to a common search space, and the second resource set includes a physical resource element set corresponding to a user-dedicated search space; or the first resource set includes a physical resource element set corresponding to transmitting a first downlink control information format (DCI format) set, and the second resource set includes a physical resource element set corresponding to transmitting a second DCI format set; or the first resource set includes a physical resource element set for transmitting common control signaling, and the second resource set includes a physical resource element set for transmitting a user equipment (UE) dedicated control signaling set; or the first resource set includes a physical resource element set corresponding to control signaling which is CRC-masked according to at least one of a system information-radio network temporary identifier (SI-RNTI), a paging-radio network temporary identifier (P-RNTI), a temporary RNTI, a random access-radio network temporary identifier (RA-RNTI), a semi persistent-radio network temporary identifier (SPS-RNTI) and a transmit power control-radio network temporary identifier (TPC-RNTI), and the second resource set includes a physical resource element set corresponding to control signaling which is CRC-masked according to a cell-radio network temporary identifier (C-RNTI); or the first resource set includes a physical resource element set corresponding to a first pilot port set, and the second resource set includes a physical resource element set corresponding to a second pilot port set.

In a second possible implementation by combining the fourth aspect, the first parameter determined by the determining unit includes a scrambling code ID which is set to 0 or 1, and an initial ID of the first demodulation pilot sequence which is set to a cell ID of a cell where the UE is located; and the second parameter determined by the determining unit includes: a scrambling code ID configured by a network side, and an initial ID of the second demodulation pilot sequence configured by the network side; or a scrambling code ID which is set to 0 or 1, and an initial ID of the second demodulation pilot sequence configured by the network side; or a scrambling code ID configured by the network side, and an initial ID of the second demodulation pilot sequence which is set to the cell ID of the cell where the UE is located.

Seen from the above solutions, the UE determines, according to a resource set, a parameter for generating an initial value of a demodulation pilot sequence, where the resource set includes a first resource set and a second resource set, and the parameter includes a first parameter and a second parameter; generates an initial value of a first demodulation pilot sequence on the first resource set according to the first parameter, and generates an initial value of a second demodulation pilot sequence on the second resource set according to the second parameter; and obtains the demodulation pilot sequence respectively by using the initial value of the first demodulation pilot sequence and the initial value of the second demodulation pilot sequence. In embodiments of the present invention, when the demodulation pilot sequence for demodulating the E-PDCCH is obtained, since the parameters for calculating the initial value of the demodulation pilot sequence are respectively configured according to a pre-partitioned resource set, after the E-PDCCH is received, the initial value of the demodulation pilot sequence can be calculated according to the resource set to which the E-PDCCH belongs and the set parameter, thus obtaining the demodulation pilot sequence for demodulating the E-PDCCH, so as to improve demodulation performance of the E-PDCCH.

BRIEF DESCRIPTION OF DRAWINGS

In order to illustrate the technical solutions in embodiments of the present invention more clearly, accompanying drawings needed in the embodiments are illustrated briefly as follows. Apparently, the accompanying drawings are merely certain of embodiments of the invention, and persons skilled in the art can derive other drawings from them without creative efforts.

DESCRIPTION OF EMBODIMENTS

Hereinafter, embodiments of the present invention provide a method and an apparatus for configuring and transmitting a pilot.

In order to have persons skilled in the art better understand technical solutions of embodiments of the present invention, and make the above objects, features, and advantages of embodiments of the present invention more comprehensible, the technical solutions of embodiments of the present invention are hereinafter described in detail with reference to the accompanying drawings.

Figure 1:
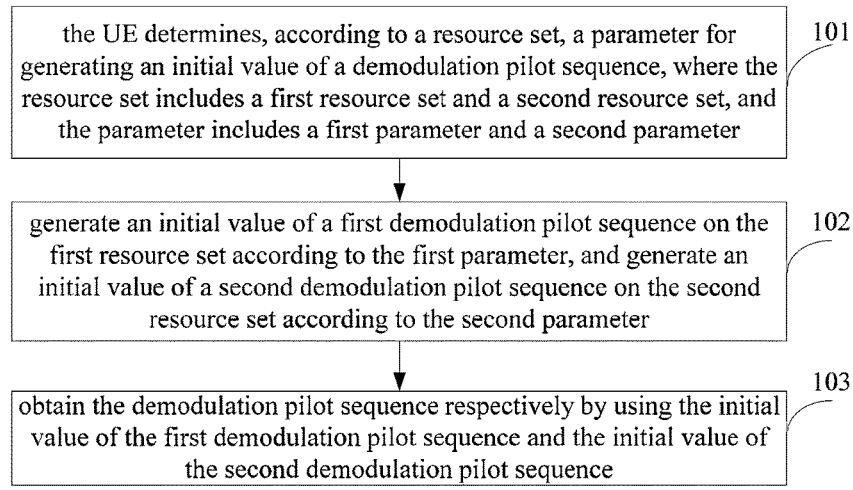
FIG. 1 is a flow chart of a method for configuring a pilot according to an embodiment of the present invention.

FIG. 1 is a flow chart of a method for configuring a pilot according to an embodiment of the present invention, and this embodiment describes the process for configuring a pilot from the UE side:

Step 101: the UE determines, according to a resource set, a parameter for generating an initial value of a demodulation pilot sequence, where the resource set includes a first resource set and a second resource set, and the parameter includes a first parameter and a second parameter.

Figure 2:
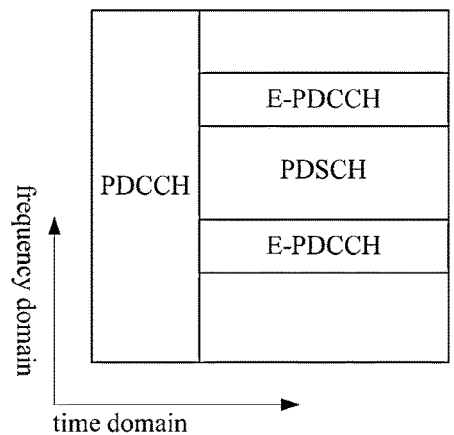
FIG. 2 is a schematic diagram of time-frequency resource allocation in an R11 system.

The method for configuring a pilot according to an embodiment of the present invention can be applied in an R11 system using the CoMP technology, and FIG. 2 is a schematic diagram of time-frequency resource allocation in an R11 system. The R11 system not only defines the existing PDCCH resource for transmitting user scheduling indication information, but also defines the E-PDCCH resource on the time-frequency resource, as shown in FIG. 2, the E-PDCCH resource occupies a part of the existing PDSCH resource, and FDM is adopted between the E-PDCCH resource and the PDSCH resource to share the time-frequency resources.

In the prior art, when the E-PDCCH multiplexes a part of the PDSCH resource, it is necessary to adopt a same demodulation manner with the PDSCH, namely, demodulating the E-PDCCH with a DMRS. However, since it is difficult for the UE to obtain a DMRS for the control channel (E-PDCCH) and thus it is not possible to demodulate the E-PDCCH for obtaining scheduling indication information. Therefore, embodiments of the present invention are to configure the demodulation pilot sequence for demodulating the E-PDCCH, where the time-frequency resource in the resource set is the E-PDCCH resource, and the demodulation pilot sequence is a pilot sequence for demodulating the E-PDCCH. The first resource set and the second resource set obtained after partitioning the resource set respectively includes a part of the E-PDCCH resource in the original resource set.

According to embodiments of the present invention, the resource set can be partitioned in the following manners:

Manner 1: when the resource set is partitioned upon a physical resource, the first resource set can include a physical resource element set provided on a system bandwidth, and the second resource set can include a physical resource element set on the system bandwidth except the provided physical resource element set, and the provided physical resource element set can be obtained via a cell ID, and/or a time slot number. The physical resource element set included in the first resource set can be the physical resource element set except the physical resource element set configured to the UE, and the physical resource element set included in the second resource set can be the physical resource element set configured to the UE; or the physical resource element set included in the second resource set is other physical resource element set in the physical resource element set configured to the UE, except the physical resource element set included in the first resource set.

Manner 2: when the resource set is partitioned upon a physical resource, the first resource set can include a physical resource element set transmitted in a discrete transmission mode, and the second resource set can includes a physical resource element set transmitted in a centralized transmission mode.

Manner 3: when the resource set is partitioned upon a physical resource, the first resource set can include a physical resource element set in beamforming transmission, and the second resource set can include a physical resource element set in diversity transmission.

Manner 4: when the resource set is partitioned upon a logical resource, the first resource set can include a physical resource element set corresponding to a common search space, and the second resource set can include a physical resource element set corresponding to a user-dedicated search space.

Manner 5: when the resource set is partitioned upon a downlink control information (DCI) format, the first resource set can include a physical resource element set corresponding to transmitting a first DCI format set, and the second resource set can include a physical resource element set corresponding to transmitting a second DCI format set.

Manner 6: when the resource set is partitioned upon a type of control signaling, the first resource set can include a physical resource element set for transmitting common control signaling, and the second resource set can include a physical resource element set for transmitting a user equipment (UE) dedicated control signaling set.

Manner 7: when the resource set is partitioned upon control signaling which is cyclic redundancy check (CRC)-masked according to different radio network temporary identifiers (RNTI), the first resource set can include a physical resource element set corresponding to control signaling which is CRC-masked according to at least one of a system information-radio network temporary identifier (SI-RNTI), a paging-radio network temporary identifier (P-RNTI), a temporary RNTI, a random access-radio network temporary identifier (RA-RNTI), a semi persistent-radio network temporary identifier (SPS-RNTI) and a transmit power control-radio network temporary identifier (TPC-RNTI), and the second resource set includes a physical resource element set corresponding to control signaling which is CRC-masked according to a cell-radio network temporary identifier (C-RNTI).

Manner 8: when the resource set is partitioned upon a pilot port, the first resource set can include a physical resource element set corresponding to a first pilot port set, and the second resource set can include a physical resource element set corresponding to a second pilot port set.

In the above implementation manners, the physical resource element set can include: at least one enhanced resource element group (eREG), or a resource element set corresponding to at least one enhanced control channel element (eCCE), or at least one physical resource block (PRB), or at least one physical resource block pair (PRB pair).

Step 102: generate an initial value of a first demodulation pilot sequence on the first resource set according to the first parameter, and generate an initial value of a second demodulation pilot sequence on the second resource set according to the second parameter.

In embodiments of the present invention, the formula for calculating the initial value of the demodulation pilot sequence is consistent with that in the prior art, and three parameters are needed, which respectively are a time slot number, a scrambling code ID, and an initial ID of the demodulation pilot sequence.

The formula below is a formula for generating an initial value of a demodulation pilot sequence:

$$c_{init}=(\lfloor n_s/2 \rfloor+1)\times(2X+1)\times2^{16}+n_{SCID}$$

In the formula above, $c_{init}$ indicates an initial value of a demodulation pilot sequence, $n_s$ indicates a time slot number, $n_{SCID}$ is a scrambling code ID, X is an initial ID of a demodulation pilot sequence, the value of X can be selected from a candidate ID set, and $\lfloor \; \rfloor$ indicates rounding to an integer. Among the above three parameters, $n_s$ can be obtained by a UE through downlink synchronization, and the initial value of the demodulation pilot sequence can be calculated through the formula above only when $n_{SCID}$ and X are configured in advance.

In this step, the first parameter is a parameter for calculating the initial value of the demodulation pilot sequence of the E-PDCCH in the first resource set, and the second parameter is a parameter for calculating the initial value of the demodulation pilot sequence of the E-PDCCH in the second resource set. The first parameter and second parameter above respectively need to include $n_{SCID}$ and X. The first parameter can include a scrambling code ID ($n_{SCID}$) which is set to 0 or 1, and an initial ID (X) of the first demodulation pilot sequence which is set to the cell ID of the cell where the UE is located. The second parameter can include a scrambling code ID ($n_{SCID}$) configured by the network side, and an initial ID (X) of the second demodulation pilot sequence configured by the network side; or a scrambling code ID ($n_{SCID}$) which is set to 0 or 1, and an initial ID (X) of the second demodulation pilot sequence configured by the network side; or a scrambling code ID ($n_{SCID}$) configured by the network side, and an initial ID (X) of the second demodulation pilot sequence which is set to the cell ID of the cell where the UE is located. Further, the scrambling code ID configured by the network side in the second parameter can specifically be: a scrambling code ID configured by the network side for the PDSCH; or a scrambling code ID configured by the network side for the E-PDCCH; the initial ID of the second demodulation pilot sequence configured by the network side in the second parameter can specifically be: an initial ID of the demodulation pilot sequence configured by the network side for the PDSCH, or an initial ID of the demodulation pilot sequence configured by the network side for the E-PDCCH. For the second parameter configured by the network side, before the UE receives the E-PDCCH, the UE can obtain the second parameter from the network side and save it.

In embodiments of the present invention, the resource set including the E-PDCCH is partitioned, as for different resource sets after partitioning, the initial value of the demodulation pilot sequence of the different resource sets are calculated according to pre-configured different parameters, thus the demodulation pilot sequence for demodulating different E-PDCCHs can be obtained according to the initial value of the demodulation pilot sequence.

Step 103: obtain the demodulation pilot sequence respectively by using the initial value of the first demodulation pilot sequence and the initial value of the second demodulation pilot sequence.

After the initial value of the demodulation pilot sequence is generated, the process of obtaining the demodulation pilot sequence according to the initial value is consistent with the process of obtaining the demodulation pilot sequence according to the initial value of the demodulation pilot sequence in the prior art, that is, the demodulation pilot sequence can be generated by the following formula:

$$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12N_{RB}^{max,DL} - 1 & normal cyclic prefix \\ 0, 1, \ldots, 16N_{RB}^{max,DL} - 1 & extended cyclic prefix \end{cases}$$

In the formula above, $N_{RB}^{max,DL}$ is the number of PRBs included in the maximum system bandwidth, m is an element of the generated sequence, the normal cyclic prefix means that the value of m ranges from 0 to $12N_{RB}^{max,DL}-1$ in the normal cyclic prefix configuration, the extended cyclic prefix means that the range of the value of m is 0 to $16N_{RB}^{max,DL}-1$ in the extended cyclic prefix configuration; where the initial value of c is the initial value $c_{init}$ of the demodulation pilot sequence generated in the previous step 101.

It should be noted that, when the partitioning of the resource set is described in embodiments of the present invention, only the manner of partitioning the resource set into two sets which are the first resource set and the second resource set is illustrated, in practical application, the resource set also can be partitioned into two more resource sets as required, as long as for the E-PDCCH in the partitioned resource set, the initial value of the demodulation pilot sequence can be calculated according to the resource set, and the E-PDCCH does not need to carry parameters for calculating the initial value of the demodulation pilot sequence, and embodiments of the invention are not limited in this respect.

Seen from the above embodiment, when the demodulation pilot sequence for demodulating the E-PDCCH is obtained, since the parameters for calculating the initial value of the demodulation pilot sequence are respectively configured according to the resource set, after the E-PDCCH is received, the initial value of the demodulation pilot sequence can be calculated according to the resource set to which the E-PDCCH belongs and the set parameter, thus obtaining the demodulation pilot sequence for demodulating the E-PDCCH, so as to improve demodulation performance of the E-PDCCH.

Figure 3:
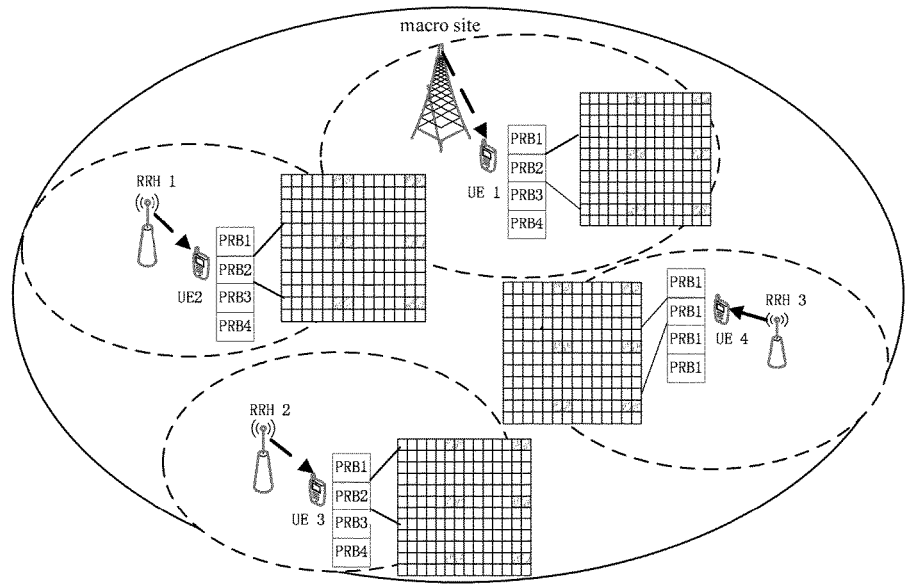
FIG. 3 is a schematic diagram of an application scenario where an embodiment of the present invention is applied in a CoMP communication system.

The method for configuring a pilot according to an embodiment of the present invention can be applied in a communication system using the CoMP technology, and FIG. 3 is a possible scenario in the communication system.

In FIG. 3, there are three remote radio head (RRH) units within a macro site, UEs under the macro site and the three RRH units can use the same PRB on the time-frequency resource to transmit the E-PDCCH, for example, in FIG. 3, they all use PRBs2 to transmit the E-PDCCH. According to the prior art, because the E-PDCCH multiplexes a part of the PDSCH resource, it is difficult to demodulate the E-PDCCH according to the manner of demodulating the PDSCH; further, if both the scrambling code ID and the initial ID of the demodulation pilot sequence adopt pre-configured fixed values when calculating the initial value of the demodulation pilot sequence, although the deficiency that it is not possible to demodulate the E-PDCCH has been overcome, since the macro site and the RRH units in FIG. 3 all use the same time-frequency resource to transmit the E-PDCCH, the initial values of the demodulation pilot sequences calculated according to the fixed values are all the same, and positions of the corresponding demodulation pilot sequences on the time-frequency resource are also the same (gray squares in FIG. 3), and therefore, a collision may occur on the demodulation pilot sequences of the E-PDCCH of the macro site and the RRH units which are transmitted on PRB2 of the same time-frequency resource, which may cause the channel estimation performance to degrade and the demodulation performance of the E-PDCCH to decrease.

Therefore, in embodiments of the present invention, through partitioning the resource set of the time-frequency resource, the initial values of the demodulation pilot sequences for different resource sets are calculated according to different parameters, so that no collision occurs among the demodulation pilot sequences of the E-PDCCH transmitted on the same time-frequency resource, and the demodulation performance of the E-PDCCH is further improved.

Hereinafter, on the basis of the previous description of the method for configuring a pilot, several manners of partitioning the resource set and corresponding process of generating the initial value of the demodulation pilot sequence are described in detail.

1. The resource set is partitioned upon a physical resource in a first manner of partitioning the resource set.

The first resource set can include a physical resource element set provided on a system bandwidth, and the second resource set can include a physical resource element set on the system bandwidth except the provided physical resource element set. For example, the physical resource block included in the first resource set can be at least one PRB located at the middle position of the system bandwidth, or at least one PRB located at the edge.

In this embodiment, for the first resource set, the initial value of the demodulation pilot sequence is usually calculated with a set fixed parameter, namely a scrambling code ID which is set to 0 or 1, and an initial ID of the demodulation pilot sequence which is set to the cell ID of the cell where the UE is located. For the second resource set, the initial value of the demodulation pilot sequence is usually calculated with a parameter configured by the network side, namely a scrambling code ID configured by the network side, and an initial ID of the demodulation pilot sequence configured by the network side; or the initial value of the demodulation pilot sequence is calculated with a combination of the set fixed parameter and the parameter configured by the network side, for example, a scrambling code ID which is set to 0 or 1, and an initial ID of the demodulation pilot sequence configured by the network side; or a scrambling code ID configured by the network side, and an initial ID of the demodulation pilot sequence which is set to the cell ID of the cell where the UE is located. Further, the second resource set can be partitioned into several resource subsets, for each resource subset, the initial value of the demodulation pilot sequence is calculated according to a set of parameters configured by the network side, that is, embodiments of the present invention can flexibly partition the resource set, and calculate the initial value of the demodulation pilot sequence for different resource sets according to different configured parameters.

Figure 4:
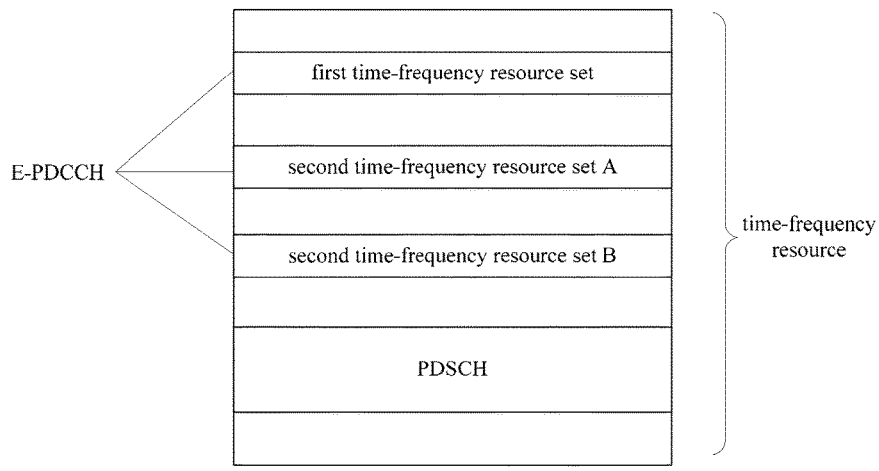
FIG. 4 is a schematic diagram of a resource set partitioned upon a physical resource according to an embodiment of the present invention.

FIG. 4 is a schematic diagram of a resource set partitioned upon a physical resource according to an embodiment of the present invention; for the first time-frequency resource set, the initial value of the demodulation pilot sequence can be calculated according to the set first parameter (for example, nSCID is 0, X is the cell ID), for the second time-frequency resource set A, the initial value of the demodulation pilot sequence can be calculated according to the second parameter configured by the network side (for example, nSCID is 0, X configured by the network side is X(0)), and for the second time-frequency resource set B, the initial value of the demodulation pilot sequence can be calculated according to the third parameter configured by the network side (for example, nSCID is 1, X configured by the network side is X(1)).

2. The resource set is also partitioned upon the physical resource in a second manner of partitioning the resource set.

The first resource set can include a physical resource element set transmitted in a discrete transmission mode, and the second resource set can include a physical resource element set transmitted in a centralized transmission mode. The discrete transmission means that data is transmitted on at least one discrete physical resource element set, and the centralized transmission means that data is transmitted on at least one continuous physical resource element set.

In this embodiment, for the first resource set, the initial value of the demodulation pilot sequence is usually calculated with a set fixed parameter, namely a scrambling code ID which is set to 0 or 1, and an initial ID of the demodulation pilot sequence which is set to the cell ID of the cell where the UE is located. For the second resource set, the initial value of the demodulation pilot sequence is usually calculated with a parameter configured by the network side, namely a scrambling code ID configured by the network side, and an initial ID of the demodulation pilot sequence configured by the network side; or the initial value of the demodulation pilot sequence is calculated with a combination of the set fixed parameter and the parameter configured by the network side, for example, a scrambling code ID which is set to 0 or 1, and an initial ID of the demodulation pilot sequence configured by the network side; or a scrambling code ID configured by the network side, and an initial ID of the demodulation pilot sequence which is set to the cell ID of the cell where the UE is located.

3. The resource set is still partitioned upon the physical resource in a third manner of partitioning the resource set.

The first resource set can include a physical resource element set in beamforming transmission, and the second resource set can include a physical resource element set in diversity transmission. For example, the beamforming transmission means that a specific precoder is used to transmit; the diversity transmission means that a spatial frequency block code (SFBC), or SFBC+frequency switched transmit diversity (FSTD), or a random beamforming, or an open loop beamforming is used to transmit.

In this embodiment, for the first resource set, the initial value of the demodulation pilot sequence is usually calculated with a set fixed parameter, namely a scrambling code ID which is set to 0 or 1, and an initial ID of the demodulation pilot sequence which is set to the cell ID of the cell where the UE is located. For the second resource set, the initial value of the demodulation pilot sequence is usually calculated with a parameter configured by the network side, namely a scrambling code ID configured by the network side, and an initial ID of the demodulation pilot sequence configured by the network side; or the initial value of the demodulation pilot sequence is calculated with a combination of the set fixed parameter and the parameter configured by the network side, namely a scrambling code ID which is set to 0 or 1, and an initial ID of the demodulation pilot sequence configured by the network side; or a scrambling code ID configured by the network side, and an initial ID of the demodulation pilot sequence which is set to the cell ID of the cell where the UE is located.

4. The resource set is partitioned upon a logical resource in a fourth manner of partitioning the resource set.

The first resource set can include a physical resource element set corresponding to a common search space, and the second resource set can include a physical resource element set corresponding to a user-dedicated search space.

In the LTE system, a control channel element (CCE) is defined as a constituent element of the E-PDCCH resource, each CCE is mapped on a set of specific time-frequency resource elements (RE) within the E-PDCCH time-frequency region. The CCE included in the E-PDCCH region is partitioned into a common search space and a user-dedicated search space by logic, where the common search space is used for transmitting scheduling indication signaling of common control information (such as, a system broadcast message, a paging message and a random access message), and the user-dedicated search space is used for transmitting scheduling indication signaling of the uplink and downlink data transmission of the user.

In this embodiment, for the first resource set, the initial value of the demodulation pilot sequence is usually calculated with a set fixed parameter, namely a scrambling code ID which is set to 0 or 1, and an initial ID of the demodulation pilot sequence which is set to the cell ID of the cell where the UE is located; for the second resource set, the initial value of the demodulation pilot sequence is usually calculated with a parameter configured by the network side, namely a scrambling code ID configured by the network side, and an initial ID of the demodulation pilot sequence configured by the network side; or the initial value of the demodulation pilot sequence is calculated with a combination of the set fixed parameter and the parameter configured by the network side, namely a scrambling code ID which is set to 0 or 1, and an initial ID of the demodulation pilot sequence configured by the network side; or a scrambling code ID configured by the network side, and an initial ID of the demodulation pilot sequence which is set to the cell ID of the cell where the UE is located.

Figure 5:
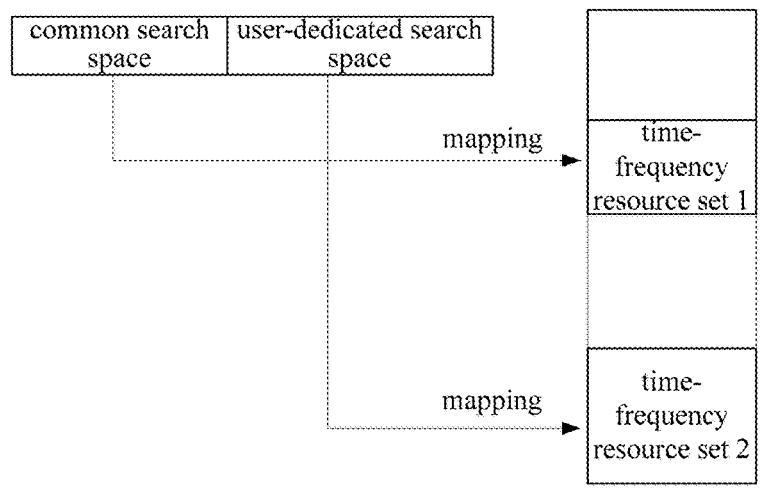
FIG. 5 is a schematic diagram of mapping relationship between a resource set partitioned upon a logical resource and a time-frequency resource according to an embodiment of the present invention.

FIG. 5 is a schematic diagram of mapping relationship between a resource set partitioned upon a logical resource and a time-frequency resource according to an embodiment of the present invention; the common search space and the user-dedicated search space respectively corresponds to a part of time-frequency resource on the system bandwidth, as shown in FIG. 5, the time-frequency resource corresponding to the common search space is indicated as a time-frequency resource set 1, and the time-frequency resource corresponding to the user-dedicated search space is indicated as a time-frequency resource set 2. For the time-frequency resource set 1, the initial value of the demodulation pilot sequence can be calculated according to the set first parameter (for example, nSCID is 0, X is the cell ID), and for the time-frequency resource set 2, the initial value of the demodulation pilot sequence can be calculated according to the second parameter configured by the network side (for example, nSCID is 0, X configured by the network side is X(0), or nSCID is 1, X configured by the network side is X(1)).

5. The resource set is partitioned upon a DCI format in a fifth manner of partitioning the resource set.

The first resource set can include a physical resource element set corresponding to a first DCI format set, and the second resource set can include a physical resource element set corresponding to a second DCI format set. For example, the first DCI format set can include formats 1A, 1B and 1C in the DCI format, and the second DCI format set can include other formats except the above formats 1A, 1B and 1C.

In this embodiment, for the first resource set, the initial value of the demodulation pilot sequence is usually calculated with a set fixed parameter, namely a scrambling code ID which is set to 0 or 1, and an initial ID of the demodulation pilot sequence which is set to the cell ID of the cell where the UE is located; for the second resource set, the initial value of the demodulation pilot sequence is usually calculated with a parameter configured by the network side, namely a scrambling code ID configured by the network side, and an initial ID of the demodulation pilot sequence configured by the network side; or the initial value of the demodulation pilot sequence is calculated with a combination of the set fixed parameter and the parameter configured by the network side, namely a scrambling code ID which is set to 0 or 1, and an initial ID of the demodulation pilot sequence configured by the network side; or a scrambling code ID configured by the network side, and an initial ID of the demodulation pilot sequence which is set to the cell ID of the cell where the UE is located.

6. The resource set is partitioned upon a type of control signaling in a sixth manner of partitioning the resource set.

The first resource set can include a physical resource element set for transmitting common control signaling, and the second resource set can include a physical resource element set for transmitting a user equipment (UE) dedicated control signaling set. For example, the common control signaling can be a cell-specific control signaling, including control signaling for scheduling the system message, control signaling for indicating power control parameters, etc.; the UE-specific control signaling can be control signaling for scheduling the uplink data or the downlink data of a user level, etc.

In this embodiment, for the first resource set the initial value of the demodulation pilot sequence is usually calculated with a set fixed parameter, namely a scrambling code ID which is set to 0 or 1, and an initial ID of the demodulation pilot sequence which is set to the cell ID of the cell where the UE is located. For the second resource set, the initial value of the demodulation pilot sequence is usually calculated with a parameter configured by the network side, namely a scrambling code ID configured by the network side, and an initial ID of the demodulation pilot sequence configured by the network side; or the initial value of the demodulation pilot sequence is calculated with a combination of the set fixed parameter and the parameter configured by the network side, namely a scrambling code ID which is set to 0 or 1, and an initial ID of the demodulation pilot sequence configured by the network side; or a scrambling code ID configured by the network side, and an initial ID of the demodulation pilot sequence which is set to the cell ID of the cell where the UE is located.

7. The resource set is partitioned upon control signaling which is CRC-masked according to different RNTIs in a seventh manner of partitioning the resource set.

The first resource set can include a physical resource element set corresponding to control signaling which is CRC-masked according to at least one of a SI-RNTI, a P-RNTI, a temporary RNTI, a RA-RNTI, a SPS-RNTI and a TPC-RNTI, and the second resource set can include a physical resource element set corresponding to control signaling which is CRC-masked according to a C-RNTI.

In this embodiment, for the first resource set the initial value of the demodulation pilot sequence is usually calculated with a set fixed parameter, namely a scrambling code ID which is set to 0 or 1, and an initial ID of the demodulation pilot sequence which is set to the cell ID of the cell where the UE is located. For the second resource set, the initial value of the demodulation pilot sequence is usually calculated with a parameter configured by the network side, namely a scrambling code ID configured by the network side, and an initial ID of the demodulation pilot sequence configured by the network side; or the initial value of the demodulation pilot sequence is calculated with a combination of the set fixed parameter and the parameter configured by the network side, namely a scrambling code ID which is set to 0 or 1, and an initial ID of the demodulation pilot sequence configured by the network side; or a scrambling code ID configured by the network side, and an initial ID of the demodulation pilot sequence which is set to the cell ID of the cell where the UE is located.

8. The resource set is partitioned upon a pilot port in an eighth manner of partitioning the resource set.

The first resource set can include a physical resource element set corresponding to a first pilot port set, and the second resource set can include a physical resource element set corresponding to a second pilot port set. The first port set can be a port within a first code division multiplexing (CDM) group, and the second port set can be a port within a second CDM group. For example, the port numbers of the ports within the first CDM group are 7, 8, 11, 13, and the port numbers of the ports within the second CDM group are 9, 10, 12, 14.

Figure 6:
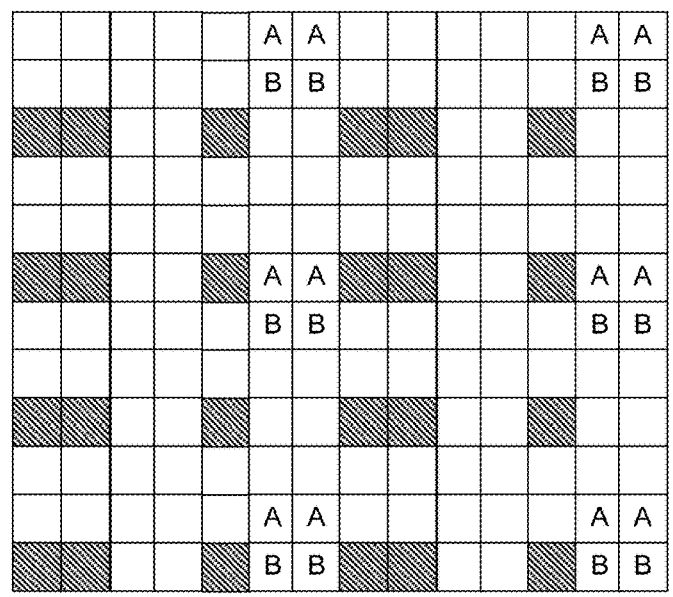
FIG. 6 is a schematic diagram of a resource set partitioned upon a port according to an embodiment of the present invention.

FIG. 6 is a schematic diagram of a resource set partitioned upon a port according to an embodiment of the present invention; in FIG. 6, the RE marked with a letter "A" indicates a physical resource block corresponding to a port in the first port set, and the RE marked with a letter "B" indicates a physical resource block corresponding to a port in the second port set.

In this embodiment, for the first resource set, the initial value of the demodulation pilot sequence is usually calculated with a set fixed parameter, namely a scrambling code ID which is set to 0 or 1, and an initial ID of the demodulation pilot sequence which is set to the cell ID of the cell where the UE is located. For the second resource set, the initial value of the demodulation pilot sequence is usually calculated with a parameter configured by the network side, namely a scrambling code ID configured by the network side, and an initial ID of the demodulation pilot sequence configured by the network side; or the initial value of the demodulation pilot sequence is calculated with a combination of the set fixed parameter and the parameter configured by the network side, namely a scrambling code ID which is set to 0 or 1, and an initial ID of the demodulation pilot sequence configured by the network side; or a scrambling code ID configured by the network side, and an initial ID of the demodulation pilot sequence which is set to the cell ID of the cell where the UE is located.

Figure 7:
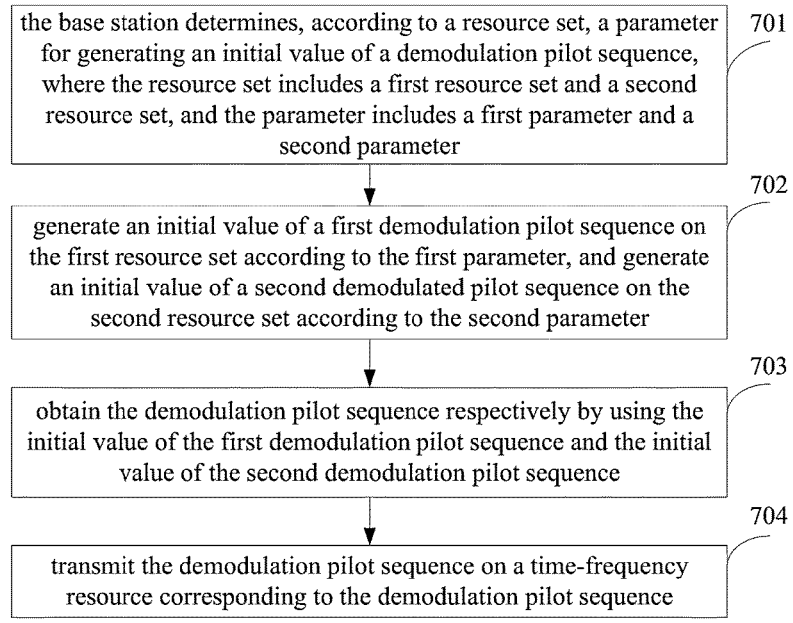
FIG. 7 is a flow chart of a method for transmitting a pilot according to an embodiment of the present invention.

FIG. 7 is a flow chart of a method for transmitting a pilot according to an embodiment of the present invention, and this embodiment describes the process for transmitting a pilot from the base station side:

Step 701: the base station determines, according to a resource set, a parameter for generating an initial value of a demodulation pilot sequence, where the resource set includes a first resource set and a second resource set, and the parameter includes a first parameter and a second parameter.

In this embodiment, the resource set includes a transmission resource for transmitting the E-PDCCH, and the demodulation pilot sequence is a pilot sequence for demodulating the E-PDCCH.

According to embodiments of the present invention, the resource set can be partitioned in the following manners:

Manner 1: when the resource set is partitioned upon a physical resource, the first resource set can include a physical resource element set provided on a system bandwidth, and the second resource set can include a physical resource element set on the system bandwidth except the provided physical resource element set, and the provided physical resource element set can be obtained via a cell ID, and/or a time slot number. The physical resource element set included in the first resource set can be a physical resource element set except the physical resource element set configured to the UE, and the physical resource element set included in the second resource set can be the physical resource element set configured to the UE; or the physical resource element set included in the second resource set is other physical resource element set in the physical resource element set configured to the UE, except the physical resource element set included in the first resource set.

Manner 2: when the resource set is partitioned upon a physical resource, the first resource set can include a physical resource element set transmitted in a discrete transmission mode, and the second resource set can includes a physical resource element set transmitted in a centralized transmission mode.

Manner 3: when the resource set is partitioned upon a physical resource, the first resource set can include a physical resource element set in beamforming transmission, and the second resource set can include a physical resource element set in diversity transmission.

Manner 4: when the resource set is partitioned upon a logical resource, the first resource set can include a physical resource element set corresponding to a common search space, and the second resource set can include a physical resource element set corresponding to a user-dedicated search space.

Manner 5: when the resource set is partitioned upon a DCI format, the first resource set can include a physical resource element set for transmitting a first DCI format set, and the second resource set can include a physical resource element set for transmitting a second DCI format set.

Manner 6: when the resource set is partitioned upon a type of control signaling, the first resource set can include a physical resource element set for transmitting common control signaling, and the second resource set can include a physical resource element set for transmitting a user equipment (UE) dedicated control signaling set.

Manner 7: when the resource set is partitioned upon control signaling which is CRC-masked according to different RNTIs, the first resource set can include a physical resource element set corresponding to control signaling which is CRC-masked according to at least one of a SI-RNTI, a P-RNTI, a temporary RNTI, a RA-RNTI, a SPS-RNTI and a TPC-RNTI, and the second resource set can include a physical resource element set corresponding to control signaling which is CRC-masked according to a C-RNTI.

Manner 8: when the resource set is partitioned upon a pilot port, the first resource set can include a physical resource element set corresponding to a first pilot port set, and the second resource set can include a physical resource element set corresponding to a second pilot port set.

In the above implementation manners, the physical resource element set can include: at least one eREG, or a resource element set corresponding to at least one eCCE, or at least one PRB, or at least one PRB pair.

Step 702: generate an initial value of a first demodulation pilot sequence on the first resource set according to the first parameter, and generate an initial value of a second demodulation pilot sequence on the second resource set according to the second parameter.

In embodiments of the present invention, the formula for calculating the initial value of the demodulation pilot sequence is consistent with that in the prior art, and three parameters are needed, which respectively are a time slot number, a scrambling code ID, and an initial ID of the demodulation pilot sequence.

The first parameter can include a scrambling code ID which is set to 0 or 1, and an initial ID of the first demodulation pilot sequence which is set to the cell ID of the cell where the UE is located; and the second parameter can include: a scrambling code ID configured by a network side, and an initial ID of the second demodulation pilot sequence configured by the network side; or a scrambling code ID which is set to 0 or 1, and an initial ID of the second demodulation pilot sequence configured by the network side; or a scrambling code ID configured by the network side, and an initial ID of the second demodulation pilot sequence which is set to the cell ID of the cell where the UE is located.

Optionally, the scrambling code ID configured by the network side can include: a scrambling code ID configured by the network side for a physical downlink shared channel (PDSCH); or a scrambling code ID configured by the network side for an enhanced physical downlink control channel (E-PDCCH); the initial ID of the second demodulation pilot sequence configured by the network side can include: an initial ID of the demodulation pilot sequence configured by the network side for the PDSCH; or an initial ID of the demodulation pilot sequence configured by the network side for the E-PDCCH.

Step 703: obtain the demodulation pilot sequence respectively by using the initial value of the first demodulation pilot sequence and the initial value of the second demodulation pilot sequence.

Step 704: transmit the demodulation pilot sequence on a time-frequency resource corresponding to the demodulation pilot sequence.

In the above embodiment, the detailed process of obtaining the demodulation pilot sequence by the base station is consistent with the embodiments as shown in FIG. 1 to FIG. 6, and will not be described in detail here.

Seen from the above embodiment, when the demodulation pilot sequence for demodulating the E-PDCCH is obtained, since the parameters for calculating the initial value of the demodulation pilot sequence are respectively configured according to the resource set, after the E-PDCCH is received, the initial value of the demodulation pilot sequence can be calculated according to the resource set to which the E-PDCCH belongs and the set parameter, thus obtaining the demodulation pilot sequence for demodulating the E-PDCCH, so as to improve demodulation performance of the E-PDCCH.

Corresponding to the method for configuring a pilot and the method for transmitting a pilot according to embodiments of the present invention, an apparatus for configuring a pilot and an apparatus for transmitting a pilot are also provided.

Figure 8:
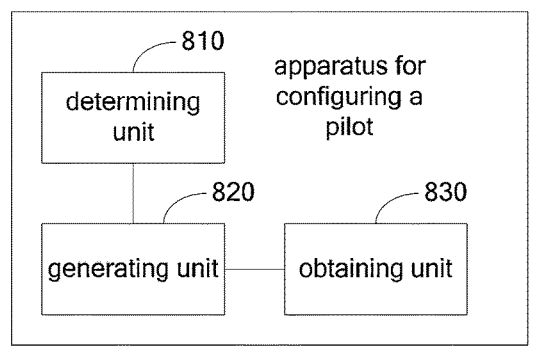
FIG. 8 is a block diagram of an apparatus for configuring a pilot according to an embodiment of the present invention.

FIG. 8 is a block diagram of an apparatus for configuring a pilot according to an embodiment of the present invention, and the apparatus is usually provided at a UE side, so as to obtain a demodulation pilot sequence for demodulating the E-PDCCH received by the UE.

The apparatus for configuring the pilot includes: a determining unit 810, a generating unit 820 and an obtaining unit 830.

The determining unit 810 is configured to determine, according to a resource set, a parameter for generating an initial value of a demodulation pilot sequence, where the resource set includes a first resource set and a second resource set, and the parameter includes a first parameter and a second parameter;

The generating element 820 is configured to generate an initial value of a first demodulation pilot sequence on the first resource set according to the first parameter, and generate an initial value of a second demodulation pilot sequence on the second resource set according to the second parameter;

The obtaining element 830 is configured to obtain the demodulation pilot sequence respectively by using the initial value of the first demodulation pilot sequence and the initial value of the second demodulation pilot sequence.

The resource set can be partitioned in the following manners:

Manner 1: when the resource set is partitioned upon a physical resource, the first resource set can include a physical resource element set provided on a system bandwidth, and the second resource set can include a physical resource element set on the system bandwidth except the provided physical resource element set, and the provided physical resource element set can be obtained via a cell ID, and/or a time slot number. The physical resource element set included in the first resource set can be a physical resource element set except the physical resource element set configured to the UE, and the physical resource element set included in the second resource set can be a physical resource element set configured to the UE; or the physical resource element set included in the second resource set is other physical resource element set in the physical resource element set configured to the UE, except the physical resource element set included in the first resource set.

Manner 2: when the resource set is partitioned upon a physical resource, the first resource set can include a physical resource element set transmitted in a discrete transmission mode, and the second resource set can includes a physical resource element set transmitted in a centralized transmission mode.

Manner 3: when the resource set is partitioned upon a physical resource, the first resource set can include a physical resource element set in beamforming transmission, and the second resource set can include a physical resource element set in diversity transmission.

Manner 4: when the resource set is partitioned upon a logical resource, the first resource set can include a physical resource element set corresponding to a common search space, and the second resource set can include a physical resource element set corresponding to a user-dedicated search space.

Manner 5: when the resource set is partitioned upon a DCI format, the first resource set can include a physical resource element set for transmitting a first DCI format set, and the second resource set can include a physical resource element set for transmitting a second DCI format set.

Manner 6: when the resource set is partitioned upon a type of control signaling, the first resource set can include a physical resource element set for transmitting common control signaling, and the second resource set can include a physical resource element set for transmitting a user equipment (UE) dedicated control signaling set.

Manner 7: when the resource set is partitioned upon control signaling which is CRC-masked according to different RNTIs, the first resource set can include a physical resource element set corresponding to control signaling which is CRC-masked according to at least one of a SI-RNTI, a P-RNTI, a temporary RNTI, a RA-RNTI, a SPS-RNTI and a TPC-RNTI, and the second resource set can include a physical resource element set corresponding to control signaling which is CRC-masked according to a C-RNTI.

Manner 8: when the resource set is partitioned upon a pilot port, the first resource set can include a physical resource element set corresponding to a first pilot port set, and the second resource set can include a physical resource element set corresponding to a second pilot port set.

In the above implementation manners, the physical resource element set can include: at least one eREG, or a resource element set corresponding to at least one eCCE, or at least one PRB, or at least one PRB pair.

The first parameter can include a scrambling code ID which is set to 0, and an initial ID of the demodulation pilot sequence which is set to the cell ID of the cell where the UE is located; and the second parameter can include: a scrambling code ID configured by a network side, and an initial ID of the demodulation pilot sequence configured by the network side; or a scrambling code ID which is set to 0 or 1, and an initial ID of the demodulation pilot sequence configured by the network side; or a scrambling code ID configured by the network side, and an initial ID of the demodulation pilot sequence which is set to the cell ID of the cell where the UE is located. In particular, the scrambling code ID configured by the network side can include: a scrambling code ID configured by the network side for a PDSCH; or a scrambling code ID configured by the network side for an E-PDCCH; the initial ID of the second demodulation pilot sequence configured by the network side can include: an initial ID of the demodulation pilot sequence configured by the network side for the PDSCH; or an initial ID of the demodulation pilot sequence configured by the network side for the E-PDCCH.

The process of configuring the pilot by the apparatus for configuring the pilot shown in the embodiment above is consistent with the previous method for configuring a pilot according to an embodiment shown in FIG. 1 to FIG. 6, and will not be described in detail here.

Figure 9:
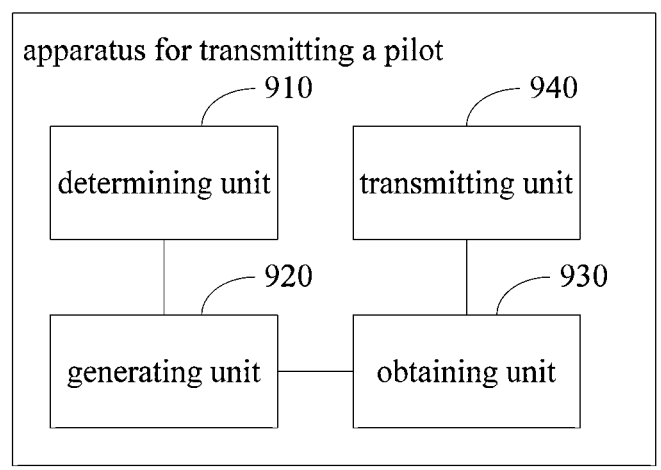
FIG. 9 is a block diagram of an apparatus for transmitting a pilot according to an embodiment of the present invention.

FIG. 9 is a block diagram of an apparatus for transmitting a pilot according to an embodiment of the present invention, and the apparatus is usually provided at a base station side.

The apparatus for transmitting a pilot includes: a determining unit 910, a generating unit 920, an obtaining unit 930 and a transmitting unit 940.

The determining unit 910 is configured to determine, according to a resource set, a parameter for generating an initial value of a demodulation pilot sequence, where the resource set includes a first resource set and a second resource set, and the parameter includes a first parameter and a second parameter;

The generating element 920 is configured to generate an initial value of a first demodulation pilot sequence on the first resource set according to the first parameter, and generate an initial value of a second demodulation pilot sequence on the second resource set according to the second parameter;

The obtaining element 930 is configured to obtain the demodulation pilot sequence respectively by using the initial value of the first demodulation pilot sequence and the initial value of the second demodulation pilot sequence;

The transmitting element 940 is configured to transmit the demodulation pilot sequence on a time-frequency resource corresponding to the demodulation pilot sequence.

The resource set can be partitioned in the following manners:

Manner 1: when the resource set is partitioned upon a physical resource, the first resource set can include a physical resource element set provided on a system bandwidth, and the second resource set can include a physical resource element set on the system bandwidth except the provided physical resource element set, and the provided physical resource element set can be obtained via a cell ID, and/or a time slot number. The physical resource element set included in the first resource set can be a physical resource element set except the physical resource element set configured to the UE, and the physical resource element set included in the second resource set can be a physical resource element set configured to the UE; or the physical resource element set included in the second resource set is other physical resource element set in the physical resource element set configured to the UE, except the physical resource element set included in the first resource set.

Manner 2: when the resource set is partitioned upon a physical resource, the first resource set can include a physical resource element set transmitted in a discrete transmission mode, and the second resource set can includes a physical resource element set transmitted in a centralized transmission mode.

Manner 3: when the resource set is partitioned upon a physical resource, the first resource set can include a physical resource element set in beamforming transmission, and the second resource set can include a physical resource element set in diversity transmission.

Manner 4: when the resource set is partitioned upon a logical resource, the first resource set can include a physical resource element set corresponding to a common search space, and the second resource set can include a physical resource element set corresponding to a user-dedicated search space.

Manner 5: when the resource set is partitioned upon a DCI format, the first resource set can include a physical resource element set for transmitting a first DCI format set, and the second resource set can include a physical resource element set for transmitting a second DCI format set.

Manner 6: when the resource set is partitioned upon a type of control signaling, the first resource set can include a physical resource element set for transmitting common control signaling, and the second resource set can include a physical resource element set for transmitting a user equipment (UE) dedicated control signaling set.

Manner 7: when the resource set is partitioned upon control signaling which is CRC-masked according to different RNTIs, the first resource set can include a physical resource element set corresponding to control signaling which is CRC-masked according to at least one of a SI-RNTI, a P-RNTI, a temporary RNTI, a RA-RNTI, a SPS-RNTI and a TPC-RNTI, and the second resource set can include a physical resource element set corresponding to control signaling which is CRC-masked according to a C-RNTI.

Manner 8: when the resource set is partitioned upon a pilot port, the first resource set can include a physical resource element set corresponding to a first pilot port set, and the second resource set can include a physical resource element set corresponding to a second pilot port set.

In the above implementation manners, the physical resource element set can include: at least one eREG, or a resource element set corresponding to at least one eCCE, or at least one PRB, or at least one PRB pair.

The first parameter can include a scrambling code ID which is set to 0, and an initial ID of the demodulation pilot sequence which is set to the cell ID of the cell where the UE is located; and the second parameter can include: a scrambling code ID configured by a network side, and an initial ID of the demodulation pilot sequence configured by the network side; or a scrambling code ID which is set to 0 or 1, and an initial ID of the demodulation pilot sequence configured by the network side; or a scrambling code ID configured by the network side, and an initial ID of the demodulation pilot sequence which is set to the cell ID of the cell where the UE is located. In particular, the scrambling code ID configured by the network side can include: a scrambling code ID configured by the network side for a PDSCH; or a scrambling code ID configured by the network side for an E-PDCCH; the initial ID of the second demodulation pilot sequence configured by the network side can include: an initial ID of the demodulation pilot sequence configured by the network side for the PDSCH; or an initial ID of the demodulation pilot sequence configured by the network side for the E-PDCCH.

The process of transmitting the pilot by the apparatus for transmitting the pilot shown in the embodiment above is consistent with the previous method for transmitting a pilot according to an embodiment shown in FIG. 7, and will not be described in detail here.

Seen from the above embodiments, the UE determines, according to a resource set, a parameter for generating an initial value of a demodulation pilot sequence, where the resource set includes a first resource set and a second resource set, and the parameter includes a first parameter and a second parameter; generates an initial value of a first demodulation pilot sequence on the first resource set according to the first parameter, and generates an initial value of a second demodulation pilot sequence on the second resource set according to the second parameter; and obtains the demodulation pilot sequence respectively by using the initial value of the first demodulation pilot sequence and the initial value of the second demodulation pilot sequence. In embodiments of the present invention, when the demodulation pilot sequence for demodulating the E-PDCCH is obtained, since the parameters for calculating the initial value of the demodulation pilot sequence are respectively configured according to a pre-partitioned resource set, after the E-PDCCH is received, the initial value of the demodulation pilot sequence can be calculated according to the resource set to which the E-PDCCH belongs and the set parameter, thus obtaining the demodulation pilot sequence for demodulating the E-PDCCH, so as to improve demodulation performance of the E-PDCCH.

It is apparent to persons skilled in the art that the present invention may be implemented through software on a necessary universal hardware platform. Based on this understanding, the technical solutions in embodiments of the present invention in essence or parts contributing to the prior art may be realized in the software product form. The computer software product can be stored in a storage medium, such as a read only memory (ROM)/random access memory (RAM), a floppy disk, or an optical disk, and includes several instructions adapted to enable a computer device (such as a personal computer, a server, or a network device, etc.) to execute the method according to each embodiment or certain parts of the embodiments of the present invention.

All embodiments in the specification are described in a progressive way, each embodiment mainly describes the differences from other embodiments, and the same and similar parts among the embodiments can be referenced mutually. In particular, the embodiments of the system are described relatively simple because they correspond to the embodiment of the method basically, and related parts may refer to the descriptions of the corresponding parts in the embodiment of the method.

The embodiments of the present invention described above are not intended to limit the scope of the invention. Any modification, equivalent replacement, and improvement made without departing from the spirit and principle of the present invention shall fall within the scope of the present invention.

What is claimed is:

1. A method, comprising:
   determining, by a user equipment (UE), according to a resource set for transmitting an enhanced physical downlink control channel (E-PDCCH) in a wireless network, a plurality of parameters for generating a plurality of initial values of demodulation pilot sequences, wherein the resource set is partitioned into a first resource set and a second resource set based on physical resource block (PRB), and the plurality of parameters comprise a first parameter and a second parameter, wherein the first parameter comprises a scrambling code identity (ID) and an initial ID of a first demodulation pilot sequence, and the second parameter comprises a scrambling code ID and an initial ID of a second demodulation pilot sequence;
   generating, by the UE, an initial value of the first demodulation pilot sequence on the first resource set comprising at least one preconfigured PRB on a system bandwidth according to the first parameter, wherein the at least one preconfigured PRB comprises a physical resource element set configured to the UE;
   generating, by the UE, an initial value of the second demodulation pilot sequence on the second resource set comprising at least one PRB on the system bandwidth except the at least one preconfigured PRB according to the second parameter;
   obtaining, by the UE, the first demodulation pilot sequence based on the initial value of the first demodulation pilot sequence, and the second demodulation pilot sequence based on the initial value of the second demodulation pilot sequence; and
   demodulating, by the UE, the E-PDCCH transmitted on the first resource set based on the first demodulation pilot sequence, and demodulating the E-PDCCH transmitted on the second resource set based on the second demodulation pilot sequence.

2. The method according to claim 1, wherein:
   the first parameter comprises a scrambling code ID which is set to 0 or 1, and an initial ID of the first demodulation pilot sequence which is set to a cell ID of a cell where the UE is located.

3. The method according to claim 1, wherein the resource set comprises a transmission resource for transmitting an E-PDCCH, and the demodulation pilot sequence is a pilot sequence for demodulating the E-PDCCH.

4. The method according to claim 1, wherein:
   the second parameter comprises: a scrambling code ID configured by a network side, and an initial ID of the second demodulation pilot sequence configured by the network side; or a scrambling code ID which is set to 0 or 1, and an initial ID of the second demodulation pilot sequence configured by the network side; or a scrambling code ID configured by the network side, and an initial ID of the second demodulation pilot sequence which is set to the cell ID of a cell where the UE is located.

5. The method according to claim 4, wherein:
   the scrambling code ID configured by the network side comprises: a scrambling code ID configured by the network side for a physical downlink shared channel (PDSCH).

6. The method according to claim 4, wherein:
   the scrambling code ID configured by the network side comprises: a scrambling code ID configured by the network side for an enhanced physical downlink control channel (E-PDCCH).

7. The method according to claim 4, wherein:
   the initial ID of the second demodulation pilot sequence configured by the network side comprises: an initial ID of the demodulation pilot sequence configured by the network side for a PDSCH.

8. The method according to claim 4, wherein:
   the initial ID of the second demodulation pilot sequence configured by the network side comprises: an initial ID of the demodulation pilot sequence configured by the network side for an E-PDCCH.

9. The method according to claim 1, wherein:
   the second resource set is partitioned into resource subsets, and for each resource subset, an initial value of a demodulation pilot sequence is calculated according to a set of parameters configured by a network side.

10. The method according to claim 1, wherein the second resource set comprises at least one PRB except a PRB comprised in the first resource set that is configured to the UE.

11. A method, comprising:
    determining, by a base station, according to a resource set for transmitting an enhanced physical downlink control channel (E-PDCCH) in a wireless network, a plurality of parameters for generating a plurality of initial values of demodulation pilot sequences, wherein the resource set is partitioned into a first resource set and a second resource set based on physical resource block (PRB), and the plurality of parameters comprise a first parameter and a second parameter, wherein the first parameter comprises a scrambling code identity (ID) and an initial ID of a first demodulation pilot sequence, and the second parameter comprises a scrambling code ID and an initial ID of a second demodulation pilot sequence;
    generating, by the base station, an initial value of the first demodulation pilot sequence on the first resource set comprising at least one preconfigured PRB on a system bandwidth according to the first parameter, wherein the at least one preconfigured PRB comprises a physical resource element set configured to the UE;
    generating, by the base station, an initial value of the second demodulation pilot sequence on the second resource set comprising at least one PRB on the system bandwidth except the at least one preconfigured PRB according to the second parameter;

obtaining, by the base station, the first demodulation pilot sequence based on the initial value of the first demodulation pilot sequence, and the second demodulation pilot sequence based on the initial value of the second demodulation pilot sequence; and transmitting, by the base station, the first demodulation pilot sequence on a time-frequency resource corresponding to the first demodulation pilot sequence, and the second demodulation pilot sequence on a time-frequency resource corresponding to the second demodulation pilot sequence.

12. The method according to claim 11, wherein:

the first parameter comprises a scrambling code ID which is set to 0 or 1, and an initial ID of the first demodulation pilot sequence which is set to a cell ID of a cell where the UE is located; and the second parameter comprises:
  a scrambling code ID configured by a network side, and an initial ID of the second demodulation pilot sequence configured by the network side; or a scrambling code ID which is set to 0 or 1, and an initial ID of the second demodulation pilot sequence configured by the network side; or
  a scrambling code ID configured by the network side, and an initial ID of the second demodulation pilot sequence which is set to the cell ID of the cell where the UE is located.

13. The method according to claim 12, wherein:

the scrambling code ID configured by the network side comprises:
  a scrambling code ID configured by the network side for a physical downlink shared channel (PDSCH); or
  a scrambling code ID configured by the network side for an enhanced physical downlink control channel (E-PDCCH);

the initial ID of the second demodulation pilot sequence configured by the network side comprises:
  an initial ID of the demodulation pilot sequence configured by the network side for the PDSCH; or
  an initial ID of the demodulation pilot sequence configured by the network side for the E-PDCCH.

14. An apparatus, comprising:

a processor; and a non-transitory processor-readable medium storing program codes that, when executed by the processor, configure the apparatus to:
  determine, according to a resource set for transmitting an enhanced physical downlink control channel (E-PDCCH) in a wireless network, a plurality of parameters for generating a plurality of initial values of demodulation pilot sequences, wherein the resource set is partitioned into a first resource set and a second resource set based on physical resource block (PRB), and the plurality of parameters comprise a first parameter and a second parameter, wherein the first parameter comprises a scrambling code identity (ID) and an initial ID of a first demodulation pilot sequence, and the second parameter comprises a scrambling code ID and an initial ID of a second demodulation pilot sequence;
  generate an initial value of the first demodulation pilot sequence on the first resource set comprising at least one preconfigured PRB on a system bandwidth according to the first parameter, wherein the at least one preconfigured PRB comprises a physical resource element set configured to the UE, and generate an initial value of the second demodulation pilot sequence on the second resource set comprising at least one PRB on the system bandwidth except the at least one preconfigured PRB according to the second parameter;
  obtain the first demodulation pilot sequence based on the initial value of the first demodulation pilot sequence, and the second demodulation pilot sequence based on the initial value of the second demodulation pilot sequence; and
  demodulate the E-PDCCH transmitted on the first resource set based on the first demodulation pilot sequence, and demodulate the E-PDCCH transmitted on the second resource set based on the second demodulation pilot sequence.

15. The apparatus according to claim 14, wherein:

the first parameter comprises a scrambling code ID which is set to 0 or 1, and an initial ID of the first demodulation pilot sequence which is set to a cell ID of a cell where the UE is located; and the second parameter comprises:
  a scrambling code ID configured by a network side, and an initial ID of the second demodulation pilot sequence configured by the network side; or
  a scrambling code ID which is set to 0 or 1, and an initial ID of the second demodulation pilot sequence configured by the network side; or a scrambling code ID configured by the network side, and an initial ID of the second demodulation pilot sequence which is set to the cell ID of the cell where the UE is located.

16. The apparatus according to claim 14, wherein:

the second resource set is partitioned into resource subsets, and for each resource subset, an initial value of a demodulation pilot sequence is calculated according to a set of parameters configured by a network side.

17. The apparatus according to claim 14, wherein the second resource set comprises at least one PRB except a PRB comprised in the first resource set that is configured to the UE.

18. An apparatus, comprising:

a processor; and a non-transitory processor-readable medium storing program codes that, when executed by the processor, configure the apparatus to:
  determine, according to a resource set for transmitting an enhanced physical downlink control channel (E-PDCCH) in a wireless network, a plurality of parameters for generating a plurality of initial values of demodulation pilot sequences, wherein the resource set is partitioned into a first resource set and a second resource set based on physical resource block (PRB), and the plurality of parameters comprise a first parameter and a second parameter, wherein the first parameter comprises a scrambling code identity (ID) and an initial ID of a first demodulation pilot sequence, and the second parameter comprises a scrambling code ID and an initial ID of a second demodulation pilot sequence;
  generate an initial value of the first demodulation pilot sequence on the first resource set comprising at least one preconfigured PRB on a system bandwidth according to the first parameter, wherein the at least one preconfigured PRB comprises a physical resource element set configured to the UE, and generate an initial value of the second demodulation pilot sequence on the second resource set comprising at least one PRB on the system bandwidth except the at least one preconfigured PRB according to the second parameter;

obtain the first demodulation pilot sequence based on the initial value of the first demodulation pilot sequence, and the second demodulation pilot sequence based on the initial value of the second demodulation pilot sequence; and transmit the first demodulation pilot sequence on a time-frequency resource corresponding to the first demodulation pilot sequence, and the second demodulation pilot sequence on a time-frequency resource corresponding to the second demodulation pilot sequence.

19. The apparatus according to claim 18, wherein:

the first parameter comprises a scrambling code ID which is set to 0 or 1, and an initial ID of the first demodulation pilot sequence which is set to a cell ID of a cell where the UE is located; and the second parameter comprises:
- a scrambling code ID configured by a network side, and an initial ID of the second demodulation pilot sequence configured by the network side; or a scrambling code ID which is set to 0 or 1, and an initial ID of the second demodulation pilot sequence configured by the network side; or
- a scrambling code ID configured by the network side, and an initial ID of the second demodulation pilot sequence which is set to the cell ID of the cell where the UE is located.

* * * * *